United States Patent Office 3,472,929
Patented Oct. 14, 1969

3,472,929
METHOD OF MAKING ALCOHOL-SOLUBLE COMPLEXES OF ALUMINUM
John L. Jones, North Plainfield, and Andrew M. Rubino, New Providence, N.J., assignors to Armour Pharmaceutical Company, Chicago, Ill., a corporation of Delaware
No Drawing. Continuation-in-part of application Ser. No. 603,133, Dec. 20, 1966, which is a continuation-in-part of application Ser. No. 472,684, July 16, 1965. This application Oct. 23, 1968, Ser. No. 770,105
Int. Cl. A61k 7/00; C07f 5/06
U.S. Cl. 424—68　　　　　　　　　　　　　　10 Claims

ABSTRACT OF THE DISCLOSURE

The present invention is directed to a method for making alcohol-soluble complexes of aluminum which consist of reacting a basic aluminum chloride and a polyhydroxy compound in an ethanol-water solution at 75° C. to 85° C., adding anhydrous ethanol and distilling off the ethanol-water azeotrope, adding benzene, and effecting a ternary azeotropic distillation to remove the water to a final product having about 0.2 to 3.0 weight percent water determined by Karl Fischer analysis.

---

The present invention is directed to a method of making alcohol-soluble complexes of aluminum.

This invention is a continuation-in-part of our patent application Ser. No. 603,133 filed Dec. 20, 1966, and now U.S. Patent No. 3,420,932. Ser. No. 603,133 was a continuation-in-part patent application of Ser. No. 472,684 filed July 16, 1965, and now abandoned. The text of Ser. No. 603,133 is incorporated herein by reference.

Ser. No. 603,133 discloses a method of making alcohol-soluble complexes of aluminum having utility as antiperspirants.

In the formulation of antiperspirants using alcohol-soluble complexes of aluminum of the type disclosed in patent application Ser. No. 603,133, it is frequently desirable to prepare alcoholic solutions of the aluminum complex having a predetermined amount of water. Generally, the total amount of water in such solutions range between about 0.2 to about 3.0 weight percent determined by Karl Fischer analysis.

Patent application Ser. No. 603,133 discloses the use of a spray drying method in which an aqueous solution containing the aluminum basic chloride and the polyhydroxy compound is spray dried to yield the desired complex. If an alcoholic solution of this material is desired, the same must be blended by dissolving the complex in alcohol.

This invention has as an object the provision of a method for forming an alcohol-soluble complex of aluminum in an alcoholic solution which avoids the necessity of drying the complex by spray drying.

This invention has as another object the provision of a method for forming an alcoholic solution of the aluminum complex of patent application Ser. No. 603,133 directly, and without the separation of dried complex.

This invention has as still a further object the provision of a method for closely controlling the amount of water in an alcoholic solution of an alcohol soluble complex of aluminum of the type disclosed in patent application Ser. No. 603,133.

Other objects will appear hereinafter.

We have discovered that alcohol-soluble complexes of aluminum of the type disclosed in patent application Ser. No. 603,133, having utility as antiperspirants, can be prepared without the need of isolating the solid complex. This is accomplished by forming the complex in an aqueous solution containing ethanol. Further ethanol may be added to the solution while distilling off the ethanol-water azeotrope. Close control of the amount of water present in the alcoholic solution can be effected by adding benzene and making a ternary distillation of the water, benzene and ethanol, and by restricting the amount of water present with the basic aluminum chloride. The resultant alcoholic solution containing between about 0.2 to 3.0 weight percent water determined by Karl Fischer analysis may be used as such, either in aerosol formulations, or in other cosmetic preparations which comprise ethanol and the alcohol-soluble aluminum complex.

The preferred coordination compounds (complexes) of the present invention have the formula:

$$Al_2(H_2O)_{y-pz}(OH)_{6-nx}Cl_n(R)_p$$

wherein R is the coordinating moiety of a polyhydroxy compound having a carbon chain in which at least two carbon atoms link a hydroxyl group to said chain; $y$ is from 2 to 6 and need not be a positive integer; $p$ is the number of mols of the polyhydroxy compound and need not be a positive integer; $z$ is the number of available coordination positions occupied by R; $n$ is 1 to 4 but need not be a positive integer; and $x$ is 1, with $nx$ being from 2 to 4.

The aforesaid formula should not be interpreted as meaning that only water is displaced by R, since R could also displace any OH which are bound to the aluminum atoms. This could also occur, interalia, by virtue of the condensation of the polyol hydroxy groups with the hydroxy groups bonded to the aluminum atoms. Where more than one hydroxy group of a given polyol molecule condenses with the hydroxy groups bonded to aluminum, chelate structures may be formed. Still other mechanisms can be postulated.

The optimum coordination compounds (complexes) of the present invention have the formula:

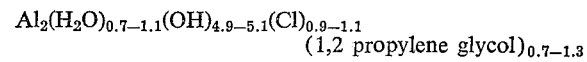
$$Al_2(H_2O)_{0.7-1.1}(OH)_{4.9-5.1}(Cl)_{0.9-1.1}$$
$$(1,2\ propylene\ glycol)_{0.7-1.3}$$

In the above formula, the 1,2 propylene glycol may be present in the complex in a number of ways, namely with both carbinol hydrogen atoms being lost by condensation or neutralization, or with only one carbinol hydrogen atom being lost by condensation or neutralization, or with both hydroxy groups remaining intact and coordinated and/or chelated to one of the aluminum atoms.

As used herein, the term "basic aluminum chloride" refers to those compounds having the formula:

$$Al_2(OH)_xCl_y$$

wherein: $x$ is a positive integer of from 2 to 5; $y$ is a positive integer of from 1 to 4; and $x$ and $y$ will always total 6. Representative of the aluminum basic chlorides herein contemplated are:

$$Al_2(OH)_2Cl_4,\ Al_2(OH)_4Cl_2,\ Al_2(OH)_5Cl$$

Water of hydration is normally present in the solid material.

The term "polyhydroxy compound" as used herein, means those organic compounds containing two or more hydroxy groups (prior to condensation) linked to adjacent or non-adjacent carbon atoms. We specifically intended to include, although not be limited to, dihydric and polyhydric alcohols.

Suitable polyhydroxy compounds for use in the practice of the present invention include: propylene glycol; 1,1,1,-trimethylol propane; 1,3-butylene glycol (1,3-butane - diol); glycerine (1,2,3 - trihydroxy propane); 2-methyl-2,4-pentane-diol; neopentyl glycol (2,2-dimethyl-1,3-dihydroxy pentane); polyethylene glycol
(mol wt.=400);

polyglycol 15–200 (a Dow material having an ethereal linkage between propylene oxide and ethylene and condensed with glycerine in which each chain has a terminal hydroxy group (mol wt.=2700)); p-xylene α, α diol; and polyepichlorohydrin; butyne-1,4diol; 2-ethyl-1,3-hexane-diol; and polypropylene glycol (av. mol. wt.=400).

The preferred polyhydroxy compound is 1,2 propylene glycol. In addition, we have obtained superior products with 1,3-butane diol, and with trimethylolpropane.

In the method of the present invention, the basic aluminum chloride[1] (aluminum chlorhydroxide) and glycol are reacted together in an ethanol-water solution at a temperature of about 75° C. to 85° C. Ethanol is added to the solution while distilling off ethanol-water azeotrope. For close control of the water concentration in the resultant alcoholic solution, a ternary distillation may be effected using benzene.

For economy of operation where an aqueous solution of basic aluminum chloride is used as an initial reactant, the amount of water present should be closely controlled as by concentrating such aqueous solution, or even drying such solution to the point where the dried basic aluminum chloride retains sufficient water to be soluble in an ethanol solution. This will reduce the cost of subsequent distillation.

The following serves to illustrate the subject invention:

EXAMPLE 1

The basic aluminum chloride having the approximate formula of $Al_2(OH)_5Cl$ was used. Such material is commercially available in a 50 weight percent aqueous solutions as "Chlorhydrol" from the Reheis Chemicals Company Division of Armour Pharmaceutical Company.

Into a 500 ml. round-bottom flask fitted with agitation and a distilling head was added 100 g. of the aqueous solution of the aforesaid basic aluminum chloride (Chlorhydrol), 40 g. of propylene glycol, and 100 ml. of anhydrous ethanol. Simultaneously added 300 ml. of anhydrous ethanol while distilling off the ethanol-water azeotrope. While continuing the distillation, slowly added 300 ml. benzene and enough ethanol to prevent gelation. Then continued adding ethanol until all of benzene had distilled over. The residue consisted of 142 g. of a slightly yellow alcoholic solution of the aluminum derivative.

*Analysis.*—6.56% Al, 4.14% Cl, 3.1% $H_2O$.

EXAMPLE 2

To 3000 g. of a 50% aqueous basic aluminum chloride solution was added 48.9 g. of 32° Bé. aluminum chloride. Using agitation, the solution was allowed to reflux at about 100° to 105° C. for a period of 4.0 hours. The solution was cooled, adjusted to 3048 g. and used in subsequent examples.

EXAMPLE 3

Exactly 200 g. of the refluxed solution from Example 2 was mixed with 47.0 g. of U.S.P. propylene glycol. Using agitation and heat, the mixture was concentrated to 194.3 g., at which point the solution became quite viscous and some solids started forming due to local overheating. The solids redissolve on cooling and agitating. To the aqueous solution was added 200 g. of anhydrous ethanol. With agitation and heating at about 80° C., the solution was concentrated to about 194 g. This addition of anhydrous ethanol and concentration was repeated with two more 200 g. increments of ethanol. Finally, the clear viscous solution was diluted to 412 g. with anhydrous SD–40 alcohol.

*Assay.*—5.86% aluminum, 4.0% chlorine, 8.8% water by Karl Fischer. Compatibility, 60 g. of alcoholic solution=62 cc. $CCl_4$*.

The amount of water present in the product of Example 3 was higher than desired. A lower amount of water in the final product can be obtained by employing the procedures set forth below.

EXAMPLE 4

The process of Example 3 was repeated except that the solution was concentrated to a net weight of 200 g. initially and after each addition of ethanol, and a total of six 200 g. increments of anhydrous ethanol was added. The clear viscous solution was finally diluted to a net weight of 412 g. with SD-40 alcohol.

*Assay.*—6.0% aluminum, 4.2% chlorine, 4.5% water by Karl Fischer, 10.7% propylene glycol. Compatibility, 60 g. of the alcoholic solution=135 cc. $CCl_4$.

EXAMPLE 5

A portion of the refluxed solution as prepared in Example 2 was spray dried in a Bowen 30" Laboratory Spray Dryer at an outlet temperature of 145° to 150° F.

*Assay.*—24.75% aluminum, 16.8% chlorine, 23.7% water by Karl Fischer.

Into a solution of 265 g. of anhydrous ethanol and 37.9 g. of propylene glycol was dissolved 100 g. of solids as prepared according to the preceding paragraph. Using agitation and heating to about 80° C., the solution was concentrated to a net weight of 338 g. To the viscous concentrate was added 200 g. of anhydrous ethanol and the agitated solution concentrated with heating to 338 g. This procedure was repeated 5 times or until a total of 1000 g. of anhydrous ethanol had been added. The solution was diluted to a net weight of 403 g. with SD–40 alcohol.

*Assay.*—5.98% aluminum, 4.08% chlorine, 3.1% water by Karl Fischer. Compatibility, 60 g. of the alcoholic solution=105 cc. of $CCl_4$.

EXAMPLE 6

To 6000 g. of a 50% aqueous basic aluminum chloride solution was added 108 g. of 32° Bé. $AlCl_3$ and the mixture refluxed at 100–105° C. for a period of 5.5 hours. The cooled solution was then spray dried in a Bowen 30" Flat Bottom Spray Dryer at an outlet temperature of about 150° F. The solids assayed 24.15% Al and 16.6% Cl.

Into a solution of 16.9 g. of propylene glycol in 133.4 g. of anhydrous ethanol was dissolved 49.7 g. of the above solids. To the agitated solution was added a total of 1100 g. of anhydrous ethanol in about 100 ml. increments. After each addition, the mixture was distilled at about 80° C. until a net weight of 200 g. was achieved. The final alcoholic product assayed 5.93% Al and 1.3% $H_2O$ by Karl Fischer and 60 g. of the solution was compatible with 206 cc. of $CCl_4$.

EXAMPLE 7

A 50% aqueous solution of basic aluminum chloride was spray dried in a 30" Bowen Flat Bottom Spray Dryer at an outlet temperature of about 150° F. The solids assayed 24.9% Al, 16.5% Cl and 22.3% $H_2O$ by Karl Fischer.

Into a solution containing 39.5 g. of trimethylol propane in 268.5 g. of anhydrous ethanol was dissolved 100 g. of the above prepared solids using agitation and heating at about 40–50° C. The cloudy solution was filtered clear and quantitatively transferred to a reaction flask using 200 g. of anhydrous ethanol. Using agitation, the clear solution was distilled at about 80° C. to a net weight of 408 g. A total of 1200 g. of anhydrous ethanol was added in ---
[1] Basic aluminum chloride is sometimes referred to as aluminum basic chloride, or aluminum chlorhydroxide.

* Defined by the number of ccs. of $CCl_4$ which will impart a permanent haze into an agitated alcoholic solution, a measure of compatibility with aerosol propellants, e.g. fluoro (chloro) hydrocarbons.

200 g. increments and, after each addition, distilled to a net weight of 408 g.

*Assay.*—5.1% Al, 3.4% Cl, 2.0% $H_2O$ by Karl Fischer. Compatibility of 60 g. of alcoholic solution=244 cc. of $CCl_4$.

The alcoholic solutions of the aluminum complexes of the present invention may be used directly in aerosol formulations. Alternatively, such solutions may be incorporated in a wide variety of cosmetic preparations for which antiperspirant properties are desired including antiperspirant deodorants applied to the skin of the user by way of a spray, wick applicator, etc.

The alcoholic solutions of the aluminum complex may be stored indefinitely as such.

The process of the present invention obviates the need for drying the aluminum complex.

The present invention may be embodied in other specific forms without departing from the spirit or essential attributes thereof and, accordingly, reference should be made to the appended claims, rather than to the foregoing specification as indicating the scope of the invention.

It is claimed:

1. The method of preparing an alcoholic solution of an inorganic-organic coordinated complex of aluminum suitable for use as an antiperspirant which comprises reacting basic aluminum chloride, a polyhydroxy compound, having at least two carbon atoms, each of which is linked to a hydroxy group, in an ethanol-water solution at a temperature of between 75° C. to 85° C. at atmospheric pressure, and removing water from said mixture by distilling off an ethanol-water azeotrope to form an alcoholic solution of the complex.

2. A method in accordance with claim 1 in which the amount of water is removed to the extent that the water present in the final complex is between 0.2 to 3.0 weight percent.

3. A method in accordance with claim 2 in which ethanol is added to the aqueous solution to form ethanol-water azeotrope during the distillation.

4. A method in accordance with claim 3 in which benzene is added to the aqueous solution, and a ternary azeotrope of benzene-ethanol-water is removed by distillation.

5. A method in accordance with claim 4 in which ethanol is added during the ternary distillation.

6. A method in accordance with claim 1 in which the basic aluminum chloride has the general formula $Al_2(OH)_5Cl$.

7. A method in accordance with claim 2 in which the complex has the formula:

$$Al_2(H_2O)_{y-pz}(OH)_{6-nx}Cl_n(R)_p$$

where R is the coordinating moiety of a polyhydroxy compound having a carbon chain in which at least two carbon atoms link a hydroxyl group to said chain; $y$ is from 2 to 6 and need not be a positive integer; $p$ is the number of mols of the polyhydroxy compound and need not be a positive integer; $z$ is the number of available coordination positions occupied by R; $n$ is 1 to 4 but need not be a positive integer; and $x$ is 1, with $nx$ being from 2 to 4.

8. A method in accordance with claim 1 in which the complex has the formula:

$$Al(H_2O)_{0.7-1.1}(OH)_{4.9-5.1}(Cl)_{0.9-1.1}(1,2 \text{ propylene glycol})_{0.7-1.3}$$

9. A method in accordance with claim 1 in which the polyhydroxy compound is 1,2 propylene glycol.

10. A method in accordance with claim 1 in which the polyhydroxy compound is trimethylol propane.

References Cited

UNITED STATES PATENTS

| | | |
|---|---|---|
| 2,466,445 | 4/1949 | Landau. |
| 2,823,169 | 2/1958 | Brown et al. |
| 2,872,379 | 2/1959 | Neumann et al. |
| 2,890,987 | 6/1959 | Hilfer. |
| 2,917,366 | 12/1959 | Hansford. |
| 3,359,169 | 12/1967 | Slater et al. |
| 2,617,757 | 11/1952 | Michael _____ 203—69 XR |

OTHER REFERENCES

Azeotropic Data, No. 6 of the Advances in Chemistry Series, American Chemical Society, Washington, D.C., 1952, pp. 6 and 254 (QD–518–D6–C-2).

TOBIAS E. LEVOW, Primary Examiner

H. M. S. SNEED, Assistant Examiner

U.S. Cl. X.R.

203—14, 63, 69; 260—448